US008335863B2

(12) United States Patent
Wookey

(10) Patent No.: US 8,335,863 B2
(45) Date of Patent: Dec. 18, 2012

(54) METHODS AND SYSTEMS FOR ENABLING FEATURES PROVIDED BY A FIRST PRESENTATION LAYER PROTOCOL IN A SESSION IMPLEMENTED ACCORDING TO A SECOND PRESENTATION LAYER PROTOCOL

(75) Inventor: Michael Wookey, Epping (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 778 days.

(21) Appl. No.: 12/467,482

(22) Filed: May 18, 2009

(65) Prior Publication Data

US 2009/0288105 A1    Nov. 19, 2009

Related U.S. Application Data

(60) Provisional application No. 61/054,440, filed on May 19, 2008.

(51) Int. Cl.
G06F 15/16 (2006.01)
(52) U.S. Cl. ........................ 709/250; 709/227
(58) Field of Classification Search .................. 709/205, 709/227, 250
See application file for complete search history.

(56) References Cited

U.S. PATENT DOCUMENTS 6,677,964 B1    1/2004 Nason et al.
6,822,943 B1 *  11/2004 Mantin .......................... 370/254
7,403,604 B2 *  7/2008 Mundra et al. ........... 379/142.02
7,882,254 B2 *  2/2011 Choi et al. ..................... 709/230
8,099,664 B2 *  1/2012 Kureshy et al. ............... 715/705

OTHER PUBLICATIONS

Anonymous:"Thread: Detecting that 1,11 application is running under Citrix, not just TS," Sep. 30, 2005, http://forums.citrix.com/thread.jspa?t hreadID=64136&tstart=0 [retrieved on Oct. 21, 2010].
EPO Communication under Rule 71(3) EPC on 09751273.5 dated May 25, 2011.
International Preliminary Report on Patentability on PCT/US2009/044307 dated Nov. 23, 2010.
International Search Report on PCT/US2009/044307 dated Nov. 2, 2010.
Written Opinion on PCT/US2009/044307 dated Nov. 2, 2010.

* cited by examiner

Primary Examiner — Minh-Chau Nguyen
(74) Attorney, Agent, or Firm — Foley and Lardner LLP; John D. Lanza

(57) ABSTRACT

A method for enabling a feature provided by a first presentation layer protocol, within a session established according to a second presentation layer protocol includes intercepting, by a hooking component executing on a first machine, a request, by an operating system executing on the first machine, for an indication whether the first machine established a session with a second machine according to a first presentation layer protocol. The method includes determining that the first machine established a session according to a second presentation layer protocol. The method includes identifying a type of a function within the operating system that generated the request for the indication. The method includes indicating that the first machine established the session according to the first presentation layer protocol, responsive to the identification of the type. The method includes enabling functionality provided for use in sessions established according to the first presentation layer protocol.

20 Claims, 15 Drawing Sheets

METHODS AND SYSTEMS FOR ENABLING FEATURES PROVIDED BY A FIRST PRESENTATION LAYER PROTOCOL IN A SESSION IMPLEMENTED ACCORDING TO A SECOND PRESENTATION LAYER PROTOCOL

RELATED APPLICATIONS

The present application claims priority to U.S. Provisional Patent Application Ser. No. 61/054,440, filed on May 19, 2008, entitled "Methods and Systems for Enabling Features Provided by a First Presentation Layer Protocol in a Session Implemented According to a Second Presentation Layer Protocol", which is incorporated herein in its entirety by reference.

FIELD OF THE INVENTION

The present disclosure relates to methods and systems for enabling features in virtualization sessions. In particular, the present disclosure relates to methods and systems for enabling features provided by a first presentation layer protocol in a session using a second presentation layer protocol.

BACKGROUND OF THE INVENTION

FIG. 1A illustrates one embodiment of a typical installation of a MICROSOFT WINDOWS operating system in which an operating system executing on a computing device queries a function to determine whether a connection to a second computing device exists, whether any such connection is active, or a type of presentation layer protocol according to which the two computing devices communicate; the function returns the appropriate responses. The operating system may, for example, directly call a function via an applications programming interface; alternatively, and in some environments, the operating system calls a hooking component 202, which makes the determination. The operating system may determine whether or not to enable certain functionality based upon a type or status of a presentation layer protocol session.

In some embodiments, either a component within the operating system or a component external to the operating system asks the operating system to determine if there is a remote session or not. In one of these embodiments, the operating system will then query a metrics acquisition function—for example, via an API or a hooking component 202—to determine whether there is an active presentation layer protocol session; the operating system returns the response to the component that made the query. In another of these embodiments, the component may determine whether or not to enable certain functionality based upon a type or status of a presentation layer protocol session. The operating system and its sub-components do not typically provide access to functionality intended for use in a session maintained according to a first presentation layer protocol when a session is maintained according to a second presentation layer protocol.

BRIEF SUMMARY OF THE INVENTION

In one aspect, a method for enabling a feature provided by a first presentation layer protocol, within a session established according to a second presentation layer protocol includes intercepting, by a hooking component executing on a first machine, a request, by an operating system executing on the first machine, for an indication whether the first machine established a session with a second machine according to a first presentation layer protocol. The method includes determining, by the hooking component, that the first machine established a session with the second machine according to a second presentation layer protocol. The method includes identifying, by the hooking component, a type of a function within the operating system that generated the request for the indication. The method includes indicating, by the hooking component, to the operating system, that the first machine established the session with the second machine according to the first presentation layer protocol, responsive to the identification of the type of the function. The method includes enabling, by the operating system, functionality provided for use in sessions established according to the first presentation layer protocol.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
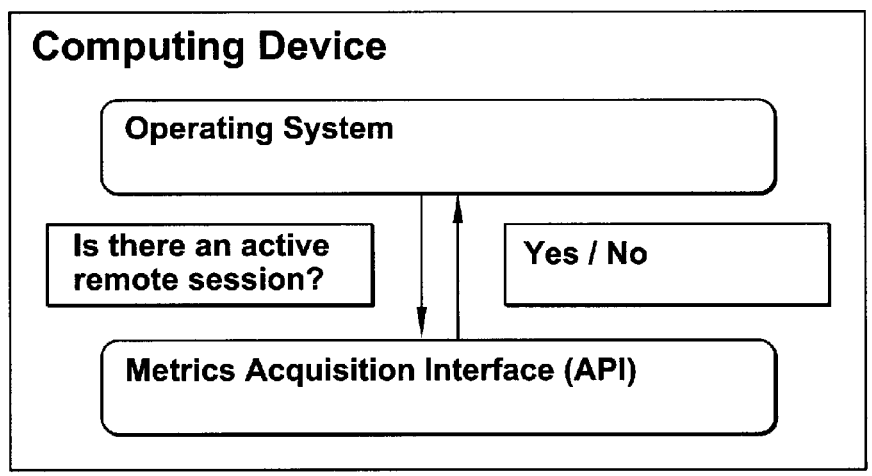
FIG. 1A is a block diagram depicting one embodiment of a typical installation of a MICROSOFT WINDOWS operating system in which an operating system executing on a computing device queries a function to determine whether a connection to a second computing device exists.
Figure 1B:
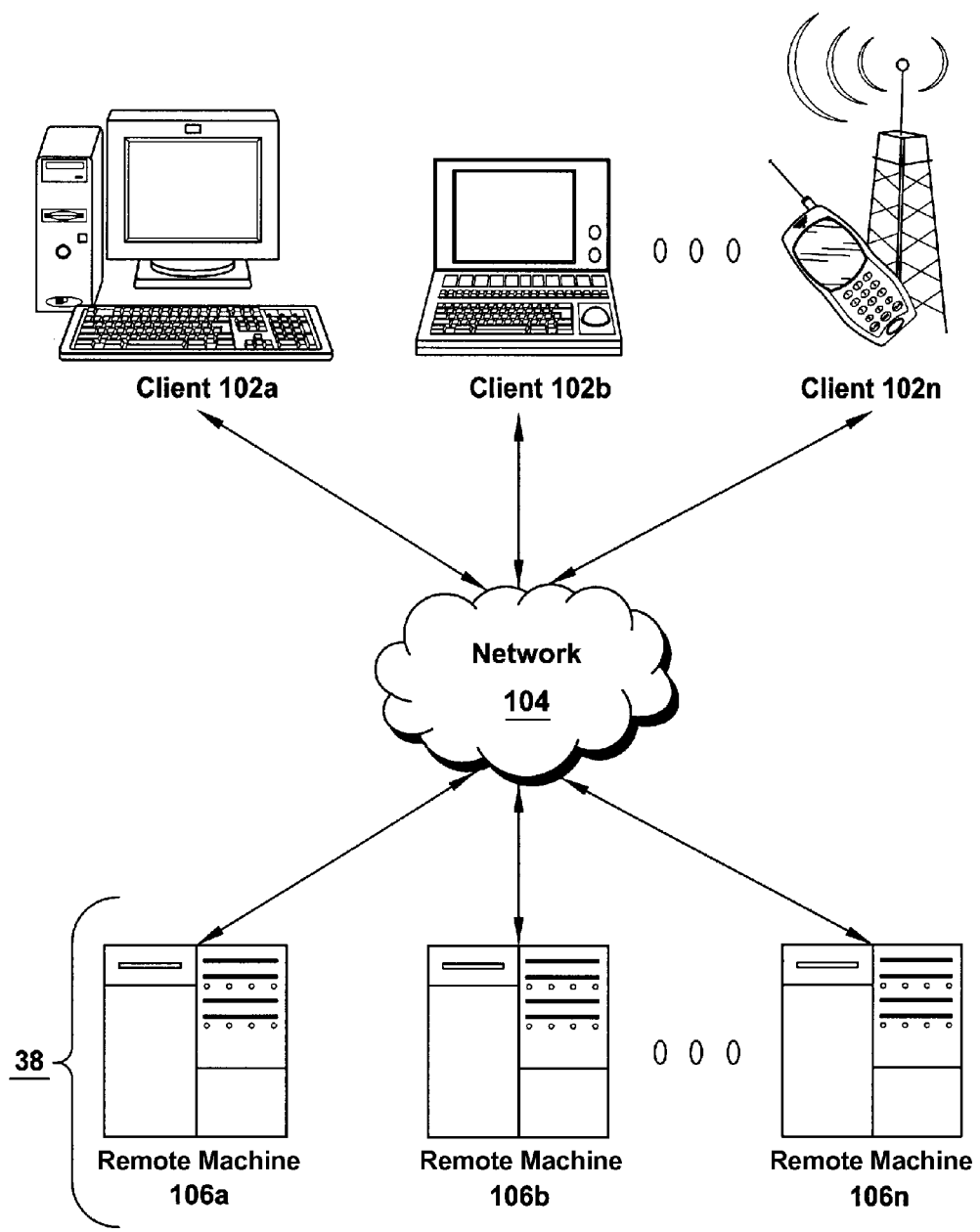
FIG. 1B is a block diagram depicting an embodiment of a network environment comprising client machines in communication with remote machines.

Referring now to FIG. 1B, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a client 102 has the capacity to function as both a client node seeking access to resources provided by a server and as a server providing access to hosted resources for other clients 102a-102n.

Although FIG. 1B shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of servers may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, manufactured by Microsoft Corp. of Redmond, Wash.), while one or more of the other remote machines 106 can operate on according to another type of operating system platform (e.g., Unix or Linux).

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a client 102. In other embodiments, a remote machine 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a client 102 communicates with a remote machine 106. In one embodiment, the client 102 communicates directly with one of the remote machines 106 in a server farm 38. In another embodiment, the client 102 executes a program neighborhood application to communicate with a remote machine 106 in a server farm 38. In still another embodiment, the remote machine 106 provides the functionality of a master node. In some embodiments, the client 102 communicates with the remote machine 106 in the server farm 38 through a network 104. Over the network 104, the client 102 can, for example, request execution of various applications hosted by the remote machines 106a-106n in the server farm 38 and receive output of the results of the application execution for display. In some embodiments, only the master node provides the functionality required to identify and provide address information associated with a remote machine 106b hosting a requested application.

In one embodiment, the remote machine 106 provides the functionality of a web server. In another embodiment, the remote machine 106a receives requests from the client 102, forwards the requests to a second remote machine 106b and responds to the request by the client 102 with a response to the request from the remote machine 106b. In still another embodiment, the remote machine 106a acquires an enumeration of applications available to the client 102 and address information associated with a remote machine 106b hosting an application identified by the enumeration of applications. In yet another embodiment, the remote machine 106 presents the response to the request to the client 102 using a web interface. In one embodiment, the client 102 communicates directly with the remote machine 106 to access the identified application. In another embodiment, the client 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a remote machine 106. In other embodiments, the remote machine 106 may display output to the client 102 using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1C:
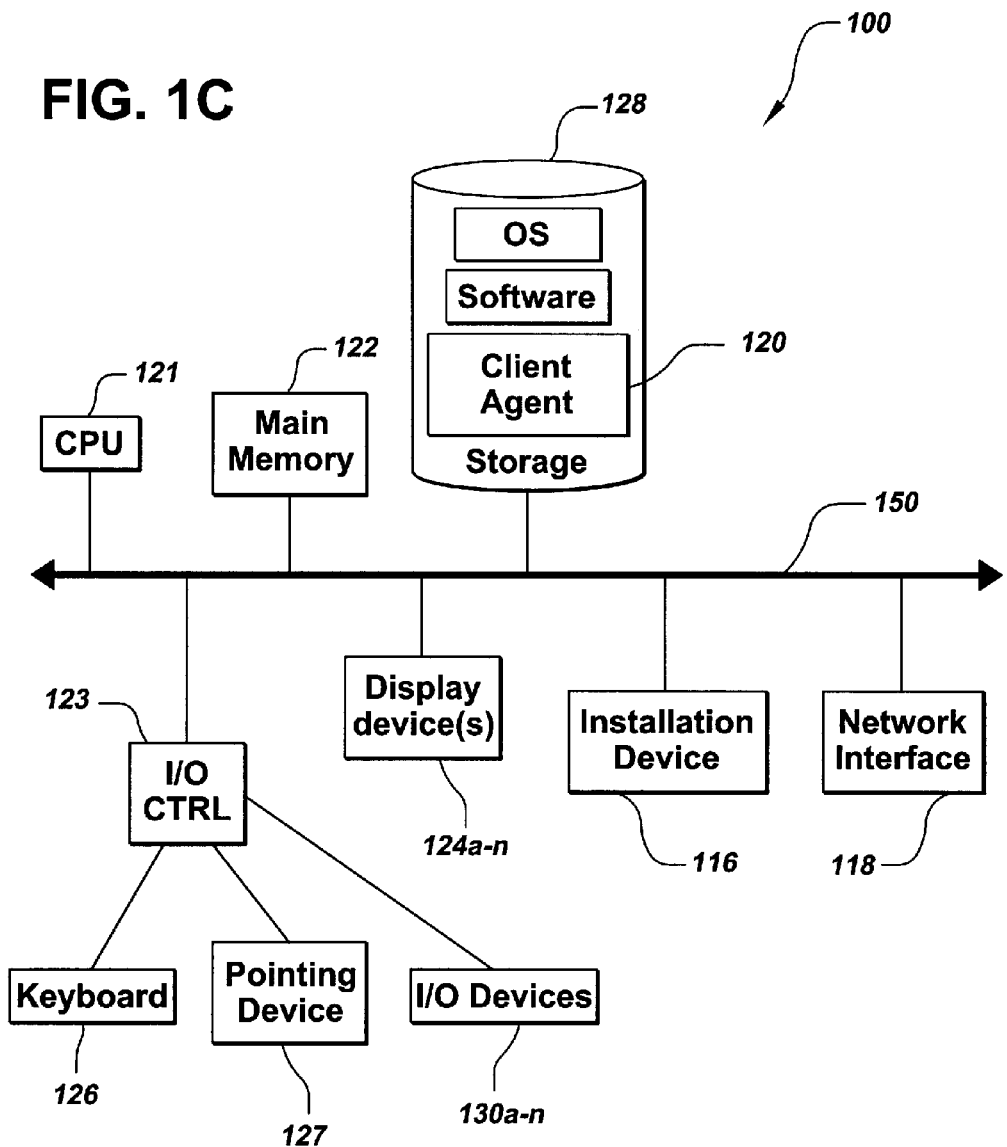
FIGS. 1C and 1D are block diagrams depicting embodiments of computers useful in connection with the methods and systems described herein.
Figure 1D:
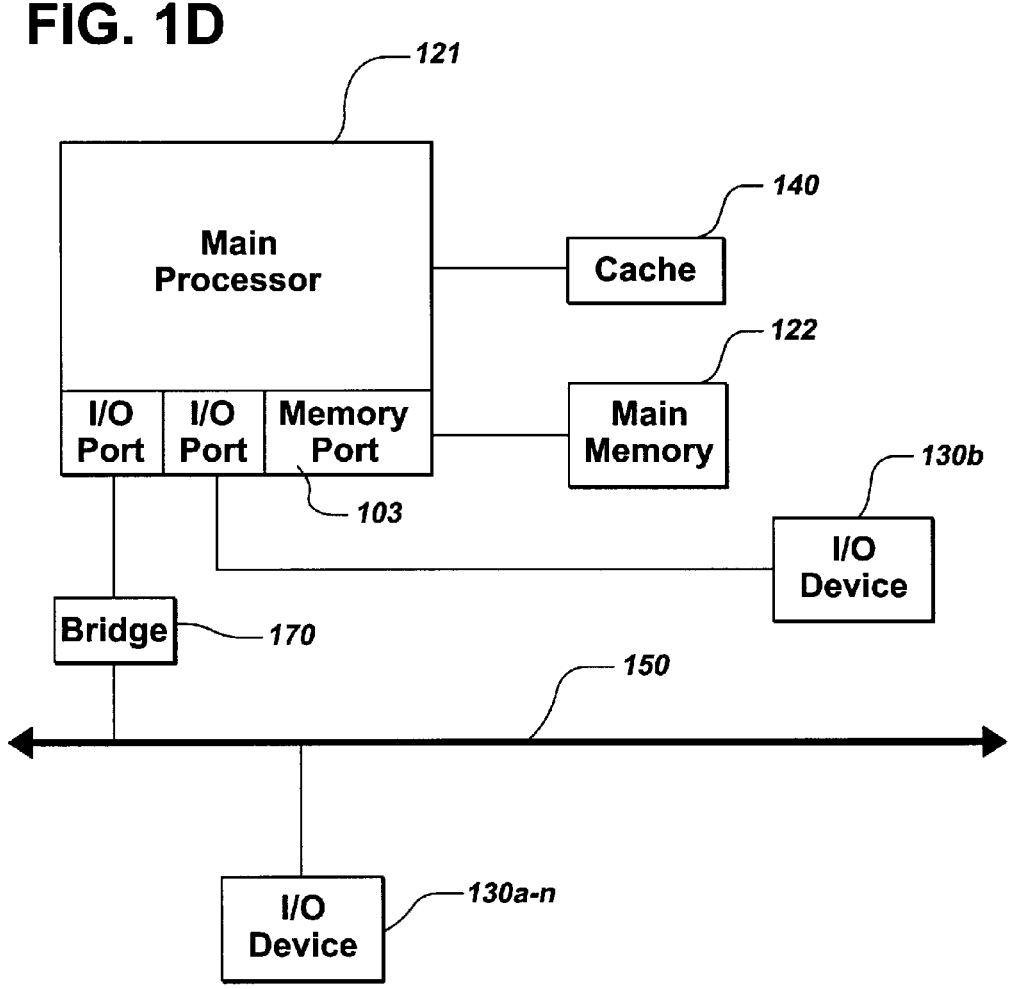

The client 102 and remote machine 106 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102 or a remote machine 106. As shown in FIGS. 1C and 1D, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1D, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1D depicts an embodiment of a computer 100 in which the main processor 121 communicates directly with I/O device 130b via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 2:
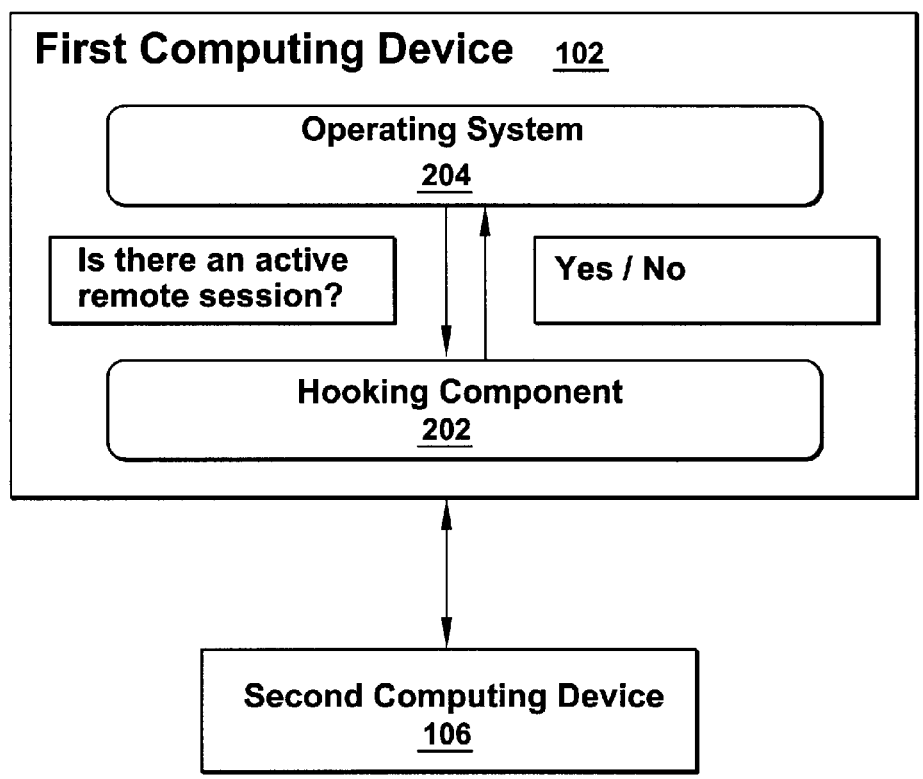
FIG. 2 is a block diagram depicting one embodiment of a system for preventing a local monitor from displaying, to an unauthorized user, data generated by a local machine while a remote, authorized user interacts with a remote display of the locally-generated data.

Referring now to FIG. 2, a block diagram depicts one embodiment of a system for enabling a feature provided by a first presentation layer protocol, within a session established according to a second presentation layer protocol. In brief overview, the system includes a hooking component 202, an operating system 204, a first computing device 102, and a second computing device 106. In some embodiments, the first computing device 102 and the second computing device 106 may also be referred to as a first machine 102 and a second machine 106. The hooking component 202 and the operating system 204 execute on the first computing device 102. The hooking component 202 intercepts a request, from the operating system 204, for an indication whether the first machine 102 established a session with the second machine 106 according to a first presentation layer protocol. The hooking component 202 determines that the first machine 102 established a session with the second machine 106 according to a second presentation layer protocol. The hooking component 202 identifies a type of a function within the operating system that generated the request for the indication. The hooking component 202 indicates, to the operating system 204, that the first machine 102 established a session with the second machine 106 according to the first presentation layer protocol. The operating system 204 enables functionality provided for use in sessions established according to the first presentation layer protocol.

In some embodiments, the methods and systems described herein provide a way to change the behavior of at least a portion of a software module, such as an operating system, under one set of conditions to express behavior that is normally only expressed under another set of conditions. In one of these embodiments, methods and systems described herein make certain optimizations and features available in a connection from a machine executing one operating system (for example, a WINDOWS XP machine) to a remote server using a first presentation layer protocol (such as ICA) that are normally only available when a connection from the machine to the remote server occurs according to a second presentation layer protocol connection (such as RDP). In another of these embodiments, a system provides a mechanism to leverage certain optimizations and features that an operating system provides for sessions provided according to a first presentation layer protocol (such as, for example, MICROSOFT TERMINAL SERVICES sessions), but without the use of that session. In still another of these embodiments, and by way of example, the methods and systems described herein overcome certain limitations that arise when connecting to a WINDOWS XP or WINDOWS VISTA workstation using ICA without the use of MICROSOFT TERMINAL SERVICES. In some embodiments, a session between a first machine 102 and a second machine 106 established and maintained according to the RDP protocol may be referred to as a MICROSOFT TERMINAL SERVICES session. It should be understood that while ICA and RDP are used as examples of presentation layer protocols, the first and second presentation layer protocols may be any presentation layer protocol including, without limitation, any of those listed above in connection with FIG. 1B.

Referring now to FIG. 2, and in greater detail, a hooking component 202 executes on a computing device 102. In one embodiment, the hooking component 202 is dynamically loaded. In another embodiment, the hooking component 202 is a filter, intercepting input/output requests. In still another embodiment, the hooking component 202 is a filter configured to intercept requests regarding a status of a connection between a first computing device and a second computing device. In yet another embodiment, the hooking component 202 is a filter configured to intercept requests regarding a type of presentation layer protocol according to which two computing devices 100 communicate.

In one embodiment, the hooking component 202 is a file system driver. In another embodiment, the hooking component 202 is a mini-driver. In still another embodiment, the hooking component 202 is a user mode hooking mechanism.

In one embodiment, the hooking component 202 is a kernel mode hooking mechanism, such as a kernel mode driver. In another embodiment, the hooking component 202 is a file system filter driver. In still another embodiment, the hooking component 202 is a mini-filter. In yet another embodiment, the hooking component 202 is a user-mode hooking apparatus.

In one embodiment, a hooking component 202 is made for the public GetSystemMetrics( ) API in the USER32.DLL library. This step may be performed, in some embodiments, by the standard hook SDK/MFAPHOOK. The hooking component 202 can perform certain optimizations to respond to the SM_REMOTESESSION query type when ICA is active and forward the through to the original function otherwise as discussed below in greater detail.

In one embodiment, the hooking component 202 is used in a situation where at least one presentation layer protocol connection to an operating system (such as an ICA-based connection to a WINDOWS operating system, including, without limitation, WINDOWS XP or WINDOWS VISTA) is a connection to a console session. In another embodiment, a console session is a session that a user is in when he or she accesses a physical or virtual machine and uses an operating system and a desktop environment provided by the physical or virtual machine, without using a form of MICROSOFT TERMINAL SERVICES to connect to the physical or virtual machine. In still another embodiment, a console session is a session that uses the physical graphics card(s) of a physical machine to produce graphics output. In yet another embodiment, a console session is a session connecting a first machine 102 (to which a user connects) to a second machine 106 providing the user with access to an operating system or desktop environment.

In one embodiment, the operating system 204 includes a component that requests a status or type of a presentation layer protocol session to determine whether to enable functionality. In another embodiment, the component may be, without limitation, one of the following MSGINA.DLL, THEMEUI.DLL, WINSRV.DLL and, EXPLORER.EXE.

In one embodiment, the operating system 204 includes functionality for querying a function, such as a metrics acquisition function, for a state or type of a presentation layer protocol session. In another embodiment, the operating system 204 may include functionality for querying a function that provides an application programming interface for use in generating queries. In still another embodiment, by way of example and without limitation, the function may be a function referred to as a GetSystemMetrics( ) function provided in a dynamically linked library and the function may provide a GetSystemMetrics( ) API. In some embodiments, the hooking component 202 intercepts calls made to such a function and includes functionality for determining whether to respond to an intercepted call or to forward the intercepted call to the function.

In one embodiment, the system includes a central brokering system (not shown) that provides access to a desktop (such as a WINDOWS XP/VISTA Desktop) running on virtual machines or on bare metal, in the data center or in an office. In another embodiment, a presentation layer protocol (such as ICA) has been implemented for WINDOWS XP/VISTA without the use of TERMINAL SERVICES, allowing a presentation layer protocol client agent to connect directly to the console session of the brokered desktop.

In some embodiments, a client machine 102 connects to a remote machine 106 using a first presentation layer protocol that provides certain features. In one of these embodiments, the first presentation layer protocol provides functionality or features distinct from those provided by a second presentation layer protocol. In another of these embodiments, in an environment implementing the second presentation layer protocol, it may be desirable to offer at least a subset of the features provided by the first presentation layer protocol.

In one embodiment, a method for enabling features provided by a first presentation layer protocol in a session using a second presentation layer protocol includes the step of establishing a session between a first machine and a second machine according to the second presentation layer protocol. In another embodiment, the method includes the step of indicating to a module that a session implemented according to the first presentation layer protocol is active. In still another embodiment, the method includes the step of enabling, by the module, functionality provided by an operating system for use in sessions established according to the first presentation layer protocol. In some embodiments, the functionality includes the disabling of certain user interface effects (like fade outs) and displaying other user interface elements, such as menu options.

Figure 3:
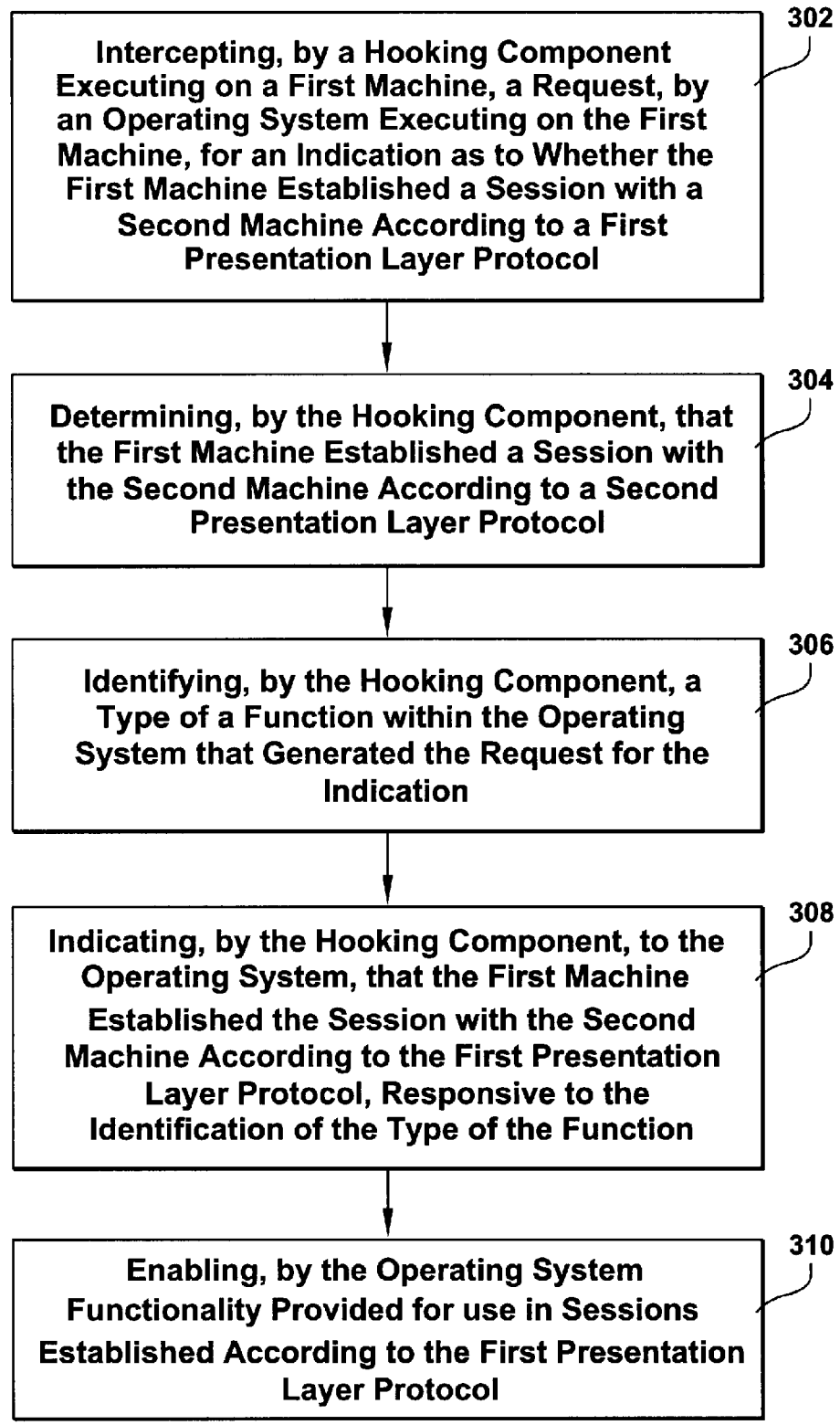
FIG. 3 is a flow diagram depicting one embodiment of a method for preventing a local monitor from displaying, to an unauthorized user, data generated by a local machine while a remote, authorized user interacts with a remote display of the locally-generated data.

Referring now to FIG. 3, a flow diagram depicts one embodiment of a method for enabling a feature provided by a first presentation layer protocol, within a session established according to a second presentation layer protocol. In brief overview, the method 300 includes intercepting, by a hooking component executing on a first machine, a request, by an operating system executing on the first machine, for an indication whether the first machine established a session with a second machine according to a first presentation layer protocol (302). The method includes determining, by the hooking component, that the first machine established a session with the second machine according to a second presentation layer protocol (304). The method includes identifying, by the hooking component, a type of a function within the operating system that generated the request for the indication (306). The method includes indicating, by the hooking component, to the operating system, that the first machine established the session with the second machine according to the first presentation layer protocol, responsive to the identification of the type of the function (308). The method includes, enabling, by the operating system, functionality provided for use in sessions established according to the first presentation layer protocol (310). In some embodiments, computer readable media having executable code for enabling a feature provided by a first presentation layer protocol, within a session established according to a second presentation layer protocol are provided. In other embodiments, the hooking component and the operating system provides means for performing the method for enabling a feature provided by a first presentation layer protocol, within a session established according to a second presentation layer protocol.

Referring now to FIG. 3, and in greater detail, the hooking component 202, executing on the first machine 102, intercepts a request, by the operating system 204 executing on the first machine 102, for an indication whether the first machine 102 established a session with the second machine 106 according to a first presentation layer protocol (302). In one embodiment, the hooking component 202 intercepts a request addressed to a metrics acquisition function.

In one embodiment, the hooking component 202 intercepts calls to a GetSystemMetrics( ) function. In another embodiment, the hooking component 202 for GetSystemMetrics( ) is called directly whenever there is a query to determine if certain parts of the system should enable functionality provided by a type of presentation layer protocol (for example, to determine whether the operating system should execute in "TERMINAL SERVICES mode" or in "ICA mode"). In some embodiments, the hooking component 202 evaluates a plurality of different tests provided by the operating system 204 or a portion thereof (such as, EXPLORER.EXE) to determine whether to enable functionality, including various items on the Start menu, animations and so forth, as described in additional detail below in connection with FIGS. 7-12.

The hooking component 202 determines that the first machine 102 established a session with the second machine 106 according to a second presentation layer protocol (304). In one embodiment, the hooking component 202 determines that the first machine 102 did not establish a session with the second machine 106 according to the first presentation layer protocol. In another embodiment, the hooking component 202 determines that the first machine 102 did not maintain a session with the second machine 106 according to the first presentation layer protocol. In still another embodiment, the hooking component 202 determines whether the first machine 102 established a session with second machine 106 by querying the metrics acquisition function to which the operating system request was addressed. In still even another embodiment, the hooking component 202 identifies a type of presentation layer protocol with which the first machine 102 established a session with second machine 106 by querying the metrics acquisition function to which the operating system request was addressed. In yet another embodiment, the hooking component 202 determines whether a session established by the first machine 102 with second machine 106 is active or inactive by querying the metrics acquisition function to which the operating system request was addressed. In some embodiments, the hooking component 202 queries a global flag to determine whether there is a remote session.

The hooking component 202 identifies a type of a function within the operating system that generated the request for the indication (306). In one embodiment, the hooking component 202 includes a mechanism for indicating to some parts of a system that a session according to a first presentation layer protocol is enabled and telling other parts that the session according to a first presentation layer protocol is not enabled—for example, the hooking component 202 may include functionality for indicating to one part of EXPLORER.EXE that a TERMINAL SERVICES session is enabled, while indicating to other parts of EXPLORER.EXE that a TERMINAL SERVICES session is disabled, based on an identification of a type of module requesting the indication. In another embodiment, this allows the hooking component 202 to provide certain parts, or sub-parts, of an operating system with information (such as a status or type of a presentation layer protocol used in a session) needed to enable functionality provided during sessions established according to one presentation layer protocol (for example, and without limitation, RDP) during sessions established according to a second presentation layer protocol (for example, and without limitation, ICA). In still another embodiment, there are several methods the hooking component 202 may implement in order to identify for which parts of an operating system to respond with an indication that results in enablement of additional functionality.

In one embodiment, when both i) a first type of presentation layer protocol session is active on the console (e.g., an ICA session) and ii) the intercepted request is for a status of a remote session (e.g., the intercepted request is directed to a function such as SM_REMOTESESSION), the hooking component 202 determines a context of the requesting function to decide whether it should provide the requesting function (which may also be referred to as its calling function) with an accurate indication of the status and type of the presentation layer protocol. In another embodiment, the hooking component 202 may determine, based on the context, to indicate to the requesting function that the requesting function is currently executing directly on the console (in which case there is no RDP-based session, for example). In still another embodiment, the hooking component 202 may determine to indicate (falsely) to the requesting function that the requesting function executes in, for example, a TERMINAL SERVICES session.

In one embodiment, the hooking component 202 provides functionality for applying context-aware matching to identify how to respond to intercepted requests from functions making requests during a presentation layer protocol session. In another embodiment, a "context" is established by taking a snapshot of the function, module or component that is calling the metrics acquisition interface with the request for the type or status of the presentation layer protocol session. In still another embodiment, this snapshot can be compared to other known snapshots. In still even another embodiment, the hooking component 202 identifies a type of a function, which may also be referred to as a context, requesting status information based on accessing a stored table of known snapshots; for example, a snapshot may refer to a return address of a function making a request. In yet another embodiment, a method may include fuzzy matching to determine a context of a function within an operating system; for example, the hooking component 202 may implement a form of pattern matching where a match can be made on an input and in which the input may have some variance from the item with which the input is matched.

In one embodiment, the hooking component 202 derives a context by obtaining a back trace to identify what function has made the intercepted request. In some embodiments, a back trace may refer to a function executed to generate a list of function calls that are currently active in a thread; in some embodiments, a back trace is obtained using public APIs. In other embodiments, a back trace results in generation of a report of active stack frames (data structures containing subroutine state information) instantiated by the execution of a program. In another embodiment, the hooking component 202 obtains the return address of the function making the intercepted request. In still another embodiment, the hooking component 202 uses the return address to identify context of the function.

In still another embodiment, the hooking component 202 derives a context for both a first function making the intercepted request and for a second function that calls the first function. In this embodiment, the hooking component 202 may derive a context for the first and second functions to determine whether a wrapper function is used to make the request on behalf of another function. In such an embodiment, the hooking component 202 may make a determination regarding how to respond to the intercepted request based on the identification of either the first, wrapper function or the second function. In some embodiments, upon identifying a context for what function (or module) within an operating system made the intercepted request, the hooking component 202 uses the context to determine how to respond to the intercepted request. In other embodiments, there is a plurality of methods that the hooking component 202 can implement to determine whether to provide to the requester accurate information regarding a type or status of a presentation layer protocol session.

In one embodiment, the hooking component 202 accesses a table of known return addresses from specific parts (modules) of an operating system—such as Explorer.exe. In another embodiment, the return address will not change for particular versions of a module and remains a constant; therefore, the return address can be used to identify parts of an operating system with the same return address. In still another embodiment, if there is an update to a return address, then this "comparison table" will be updated to include the new address details. In some embodiments, deriving a context results in identification of a return address associated with a function generating the intercepted request. In one of these embodiments, by way of example, and without limitation, a table stores a mapping between a return address associated with a function making a request and an identification of the function itself, for example:

| Return address | Function or Module within Operating System |
|---|---|
| 0x0017f39f | Explorer.exe |
| 0x7599785d | MSGINA!CDimmedWindow::Create+0x27 |
| 0x5ba73f5c | THEMEUI!CDimmedWindow::WndProc+0x2c7 |

In another of these embodiments, the hooking component 202 uses the return address and the table of known return addresses mapped to sub-parts of an operating system to identify a function, module or other part of an operating system that generated the intercepted request. In still another of these embodiments, and as an example, the hooking component 202 may use a return address to identify a component within the operating system that directs the display of a menu (such as a "Start" menu) and that makes a query to determine whether there is a remote session in order to determine which menu items to display.

In other embodiments, the hooking component 202 uses the identified return address from the context as a pivot point to obtain a "signature". In one of these embodiments, the "signature" is, for example, 32 bytes in size with 16 bytes leading up to the call to the metrics acquisition interface (e.g., GetSystemMetrics (SM_REMOTESESSION)) and 16 bytes following the call to the metrics acquisition interface (e.g., GetSystemMetrics (SM_REMOTESESSION)). In another of these embodiments, the signature is, for example, obtained for a 64-bit module. In still another of these embodiments, by masking out parts of the code sequence that may change between different module versions, a code signature can be stored that has negligible differences between releases of a module. In still even another of these embodiments, this also allows for handling of a module that has had alterations from a base version (for example, WINDOWS XP SERVICE PACK 2 through to updated versions of WINDOWS XP SERVICE PACK 2 through WINDOWS XP SERVICE PACK 3 through to WINDOWS VISTA). In yet another embodiment, by keeping a table of signatures, the captured signature from the context can be compared against a stored signature.

In some embodiments, by way of example, and without limitation, a signature has the following form:
"\x75\x8B\xD8\xF7"       "\xDB\x1A\xDB\x68"
   "\x00\x10\x00\x00" "\xFE\xC3\xFF\xD7"
"\xF7\xD8\x1A\xC0"       "\xFE\xC0\x6A\x00"
   "\x88\x45\xFF\x8D" "\x45\xF8\x50\x6A"
In one of these embodiments, a routine within a module within the operating system 204 has a name such, for example, "EXPLORER!_ShowStartMenuShutdown". In another of these embodiments, the 32 bytes of code leading up and following to the call to the metrics acquisition interface have a form, such as, for example:
00 3B C3 75 : 0F B9 00 10:00 00 FF 15 : A7 96 06 00
3B C3 75 05 :BB 01 00 00:00 8B C3 48 : 83 C4 20 5B
In still another of these embodiments, masking parts of the code that may change results in a mask such as, for example:
1111'1111'1111'1111'0000'1111'1111'1110. In yet another of these embodiments, the 32 bytes of code are placed in an array creating the signature; such a signature may have, for example, the following form:
"\x00\x3B\xC3\x75" "\x0F\xB9\x00\x10"
"\x00\x00\xFF\x15" "\xA7\x96\x06\x00"
"\x3B\xC3\x75\x05" "\xBB\x01\x00\x00"
"\x00\x8B\xC3\x48" "\x83\xC4\x20\x5B"

In some embodiments, if the captured signature matches a stored signature, then the hooking component 202 makes a determination to indicate to the calling function that it is in a presentation layer protocol session (regardless of whether or not such a session exists). In other embodiments, the if the captured signature matches a stored signature, then the hooking component 202 makes a determination to pass the request through to the metrics acquisition interface for processing without modification. In further embodiments, the code emitted by the compiler does not change unless the source code has been altered in that specific area—in which case a new signature may be generated.

The hooking component 202 indicates, to the operating system 204, that the first machine 102 established the session with the second machine 106 according to the first presentation layer protocol, responsive to the identification of the type of the function (308). In some embodiments, the hooking component 202 accesses a database to determine whether to indicate to the operating system that the first machine established the session with the second machine according to the first presentation layer protocol. In one of these embodiments, the hooking component 202 accesses a database and makes a determination to respond to the identified type of the function with an indication that the first machine 102 established the session with the second machine 106 according to the first presentation layer protocol for the duration of an active session between the first machine 102 and the second machine 102 according to a second presentation layer protocol, regardless of whether the first machine 102 and the second machine 106 also have an active or established session according to the first protocol.

In some embodiments, the hooking component 202 intercepts a request, by the operating system, for an indication whether a session established between the first machine and the second machine according to the first presentation layer protocol is active. In one of these embodiments, the hooking component 202 determines that the session established between the first machine and the second machine according to the first presentation layer protocol is inactive; the hooking component 202 determines that a session established between the first machine and the second machine according to the second presentation layer protocol is active; and the hooking component 202 indicates, to the operating system 204, that the session established according to the first presentation layer protocol is active. In another of these embodiments, the hooking component 202 determines that the first machine 102 did not establish a session with the second machine 106 according to the first presentation layer protocol, the hooking component 202 determines that a session established between the first machine and the second machine according to the second presentation layer protocol is active; and the hooking component 202 indicates, to the operating system 204, that the session established according to the first presentation layer protocol is active.

In some embodiments, the hooking component 202 identifies a type of a second function within the operating system that generates a second request for an indication whether the first machine established a session with a second machine according to a first presentation layer protocol. In one of these embodiments, the hooking component 202 indicates, to the operating system 204, that the first machine established the session with the second machine according to the second presentation layer protocol, responsive to the identification of the type of the second function. In another of these embodiments, the operating system disables functionality of a first type provided for use in sessions established according to a first presentation layer protocol, responsive to the received indication. In still another of these embodiments, the operating system 204 replaces the disabled functionality of the first type with functionality of a second type. In still even another of these embodiments, the second function within the operating system 204 disables functionality of a first type provided for use in sessions established according to a first presentation layer protocol, responsive to the received indication. In still another of these embodiments, the second function within the operating system 204 replaces the disabled functionality of the first type with functionality of a second type.

The operating system 204 enables functionality provided for use in sessions established according to the first presentation layer protocol (310). In some embodiments, the operating system 204 enables functionality including, by way of example, and without limitation, functionality such as graphics settings, configuration options, or menu items. In other embodiments, the operating system 204 enables functionality as described below in connection with FIGS. 7-12.

In one embodiment, during an active session based on a first presentation layer protocol such as, for example, an RDP-based session, an operating system 204 enables different functionality than it would enable if the session were inactive or terminated. In another embodiment, however, sessions based on other presentation layer protocols may not trigger the operating system 204 to enable the functionality. In still another embodiment, by indicating to the operating system component responsible for enabling the functionality that a remote session based on the first presentation layer protocol is active, the hooking component 202 enables the functionality typically enabled during sessions based on the first presentation layer protocol during a session based on a second presentation layer protocol.

Figure 4:
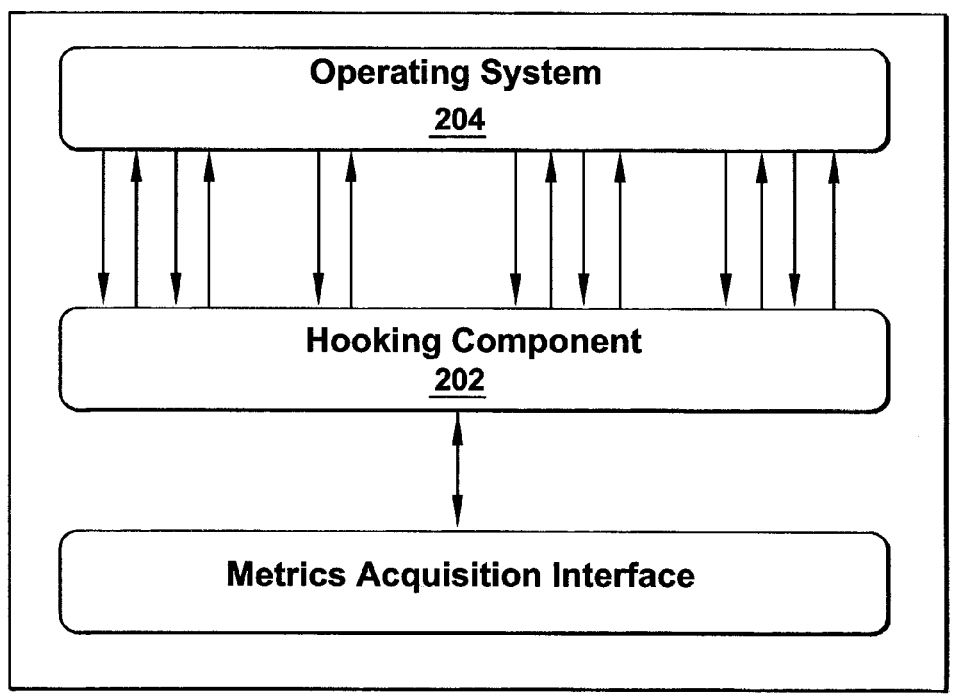
FIG. 4 is a block diagram depicting an embodiment of a system for enabling features provided by a first presentation layer protocol in a session using a second presentation layer protocol.

Referring now to FIG. 4, a block diagram depicts an embodiment of a system for enabling features provided by a first presentation layer protocol in a session using a second presentation layer protocol. In some embodiments, a modified hook 202 is implemented that identifies which part of a module is querying for an answer and returns a particular answer to some parts of a module and another answer to different parts of the same module (such as an operating system). In one of these embodiments, the use of the modified hook 202 allows the system to target specific parts of a module (such as an operating system) and have the module operate as if the module were operating under RDP, or other presentation layer protocol, while other parts of the same module are not told that a particular presentation layer protocol session is active. In another of these embodiments, the use of the modified hook 202 allows selective enabling of certain presentation layer protocol features; for example, and without limitation, functionality provided in sessions established or maintained according to a presentation layer protocol such as RDP may be provided in sessions established or maintained according to other presentation layer protocols and without RDP being active.

Figure 5:
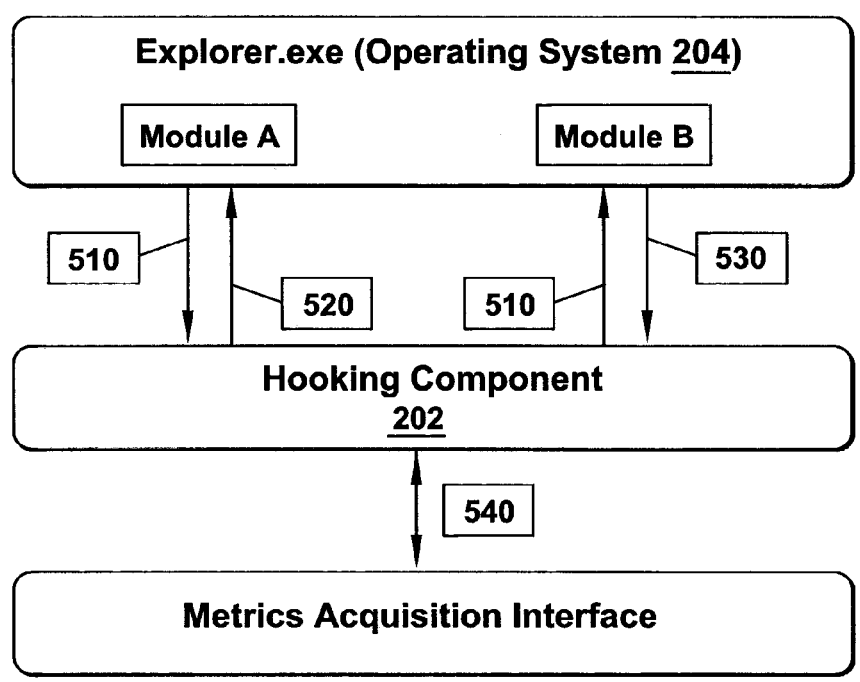
FIG. 5 is a block diagram depicting an embodiment of a system for enabling features provided by a first presentation layer protocol in a session using a second presentation layer protocol.

Referring now to FIG. 5, a block diagram depicts an embodiment of a system for enabling features provided by a first presentation layer protocol in a session using a second presentation layer protocol. As shown in FIG. 5, the arrows represent the following example of an exchange between the operating system 204 and the hooking component 202:

Arrows 510—Request from operating system 204 for status or type of session (e.g., "Is there an active, remote session established between this machine and a second machine according to RDP?")

Arrows 520—Response from hooking component 202 (e.g., "No")

Arrows 530—Response from hooking component 202 (e.g., "Yes")

As depicted in FIG. 5, the hooking component 202 may respond to the same request 510 from a first module ("Module A") with a response 520 ("No") while responding to a request 510 from a second module ("Module B") with a response 530 ("Yes"). The hooking component 202 can, therefore, respond to certain modules or parts of a module (EXPLORER.EXE, in this example) with an indication that there is an active session maintained according to a first type of presentation layer protocol (RDP, in this example), while telling other parts of the same module that there is not an active session maintained according to the first type of presentation layer protocol. In some embodiments, the hooking component 202 exchanges data with a function to which the request was originally addressed (540). In some embodiments, and as described in greater detail above, the hooking component 202 determines a type, or context, of a module calling the function with the request and indicates to the component that a session—such as a TERMINAL SERVICES—is active (even if no TERMINAL SERVICES session exists or if an existing TERMINAL SERVICES session is inactive) responsive to the step of determining the context.

Figure 6:
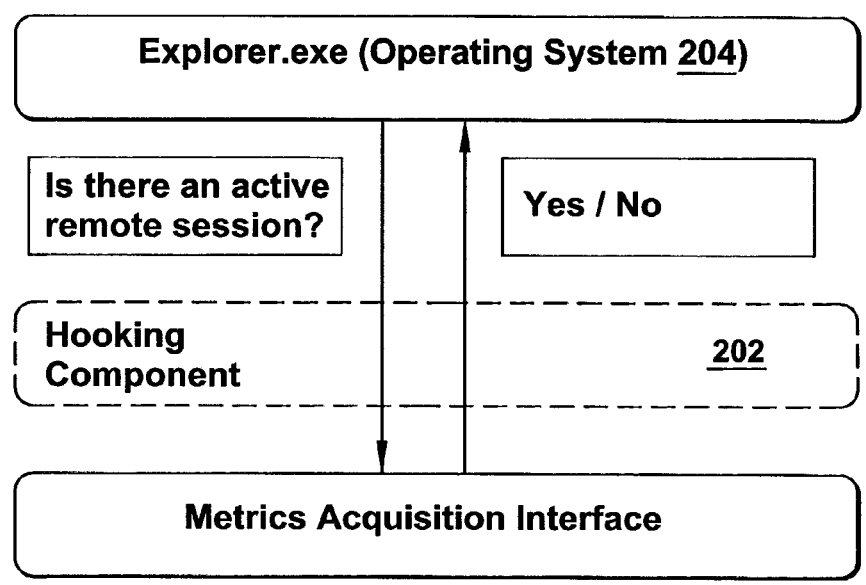
FIG. 6 is a block diagram depicting one embodiment of a system for enabling features provided by a first presentation layer protocol in a session using a second presentation layer protocol where the system is in pass-through mode.

Referring now to FIG. 6, a block diagram depicts an embodiment of the system in pass-through mode. In some embodiments, the hooking component 202 is active when there is an active session established or maintained according to a particular presentation layer protocol. In one of these embodiments, for example, the hooking component 202 may be active when there is an active ICA-based session to a second machine 106 and inactive when there is no presentation layer protocol session or a session established or maintained according to a second, non-ICA presentation layer protocol. In other embodiments, in which an ICA session is not active, the hooking component 202 may act in a "pass through" mode as shown in FIG. 6. In one of these embodiments, the hooking component 202 forwards the intercepted request to a metrics acquisition interface without modification.

Figure 7:
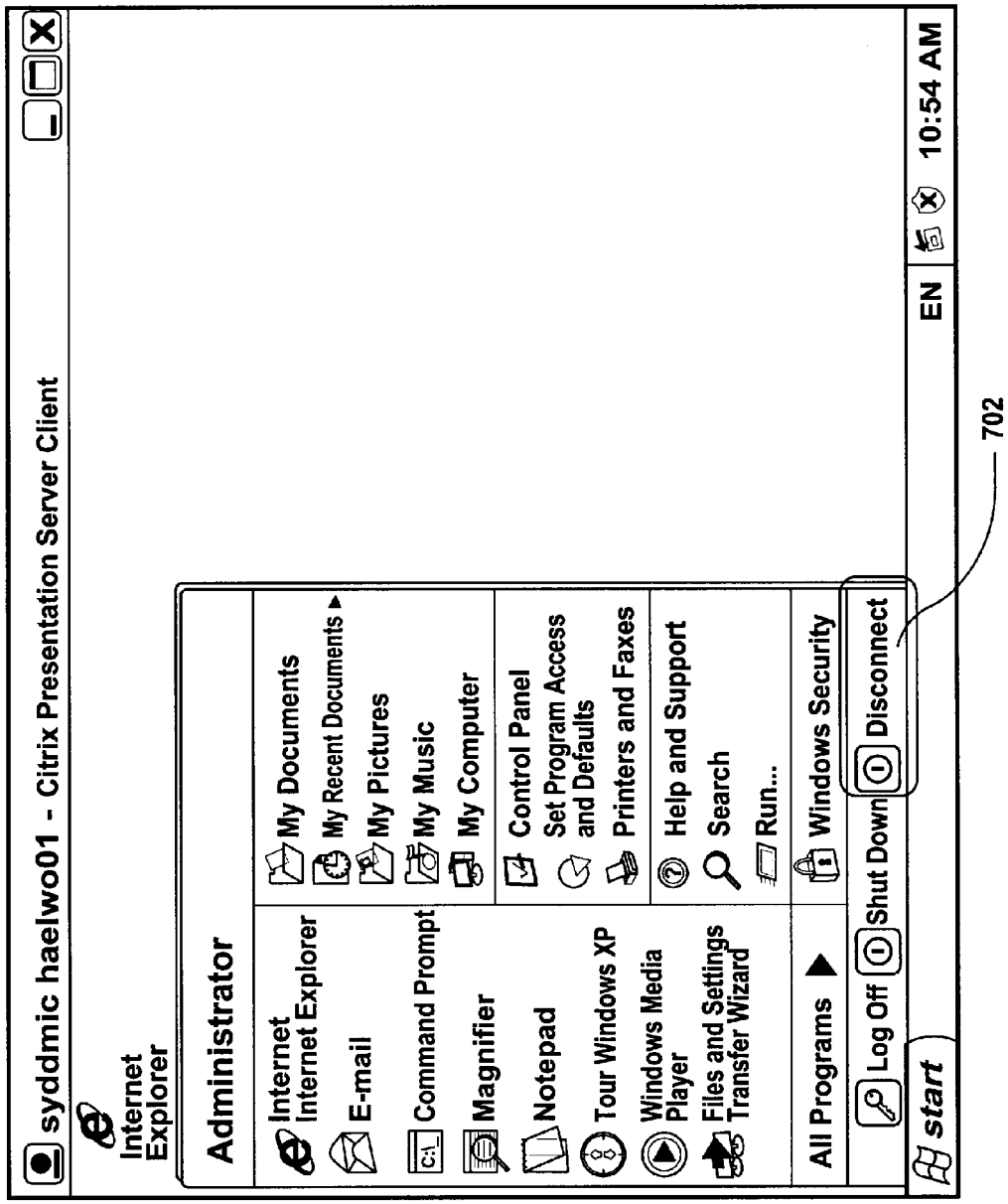
FIG. 7 is a screen shot depicting one embodiment of a system providing access in one presentation layer protocol session to a menu item typically provided by a second presentation layer protocol.

Referring now to FIG. 7, a screen shot depicts one embodiment of a system providing access in one presentation layer protocol session to a menu item typically provided by a second presentation layer protocol. In one embodiment, a "Start" menu on a console does not normally provide a "Disconnect" item 702; the item 702 typically appears when a remote terminal server session is active. In another embodiment, in which there is a presentation layer protocol connection (e.g., an ICA connection) to a console session, a mechanism is provided allowing a user to disconnect from the session. In still another embodiment, when the presentation layer protocol session is active, the hooking component 202 intercepts requests for a status or type of the presentation layer protocol session, identifies a specific part of the operating system making the request, and responds with an indication that there is an active remote session, resulting in a direction to a component in the operating system (such as the shell) to display within the "Start" menu the "Disconnect" item 702. In still even another embodiment, other operating system components that request a status or type of session are given the opposite information, in order to avoid side effects. In yet another embodiment, if a user selects the "Disconnect" item 702, the hooking component 202 intercepts this request and issues an disconnect command in accordance with the presentation layer protocol used by the active session instead of a command in accordance with a second presentation layer protocol.

Figure 8:
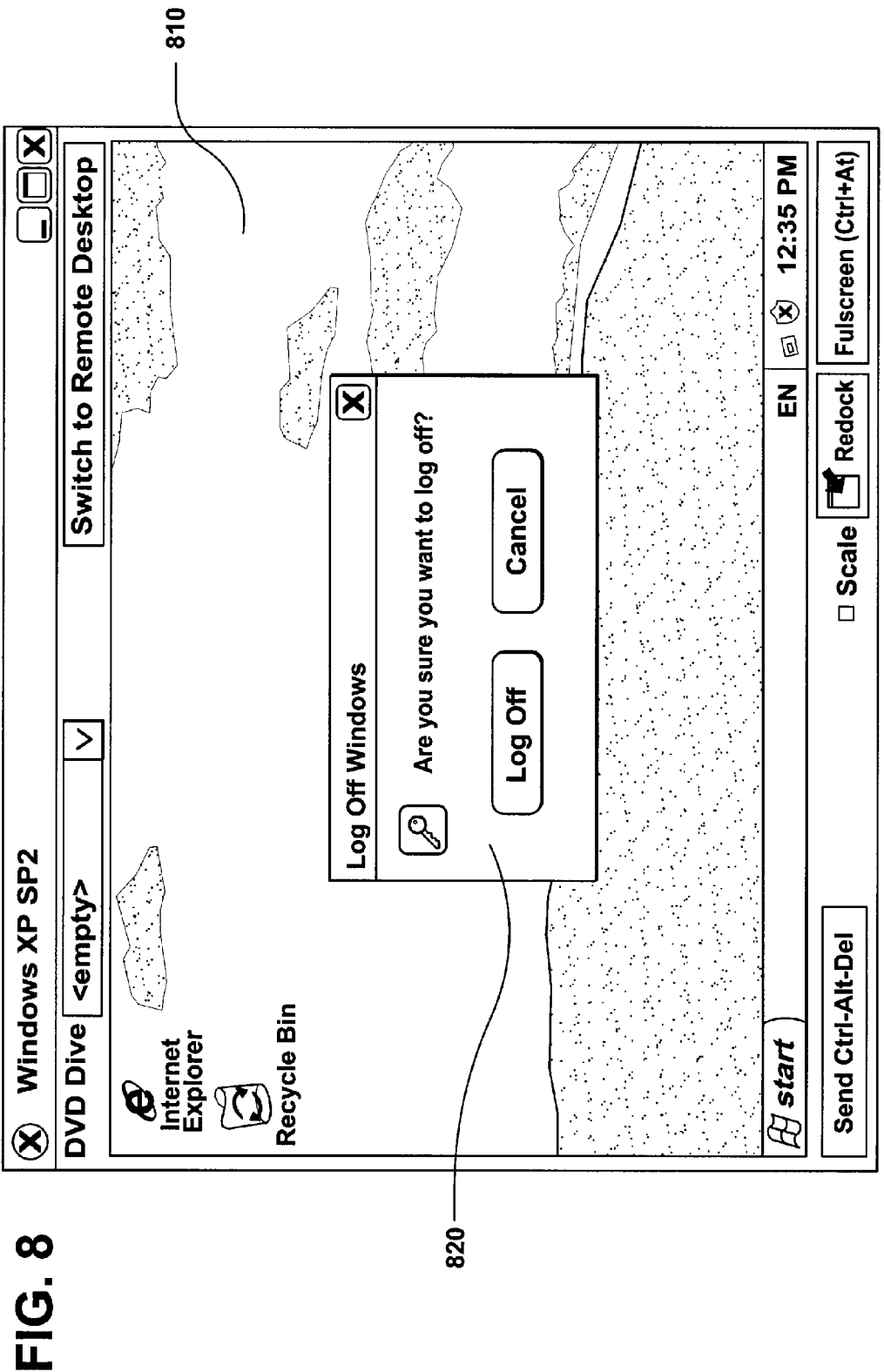
FIG. 8 is a screen shot depicting one embodiment of a system for providing access in one presentation layer protocol session to a graphical effect in a user interface, the graphical effect typically provided by a second presentation layer protocol.

Referring now to FIG. 8, a screen shot depicts one embodiment of a system providing access in one presentation layer protocol session to a graphical effect in a user interface, the graphical effect typically provided by a second presentation layer protocol. In one embodiment, WINDOWS XP performs a "fade out" of the desktop to grayscale images when the user selects "Log Off" or "Shut Down" from the Start menu. As shown in FIG. 8, the screen area 810 includes the grayed out portion of the screen and screen area 820 represents a portion of a screen that is not grayed out. In some embodiments, a fade out effect also occurs if a user modifies a desktop theme. In one embodiment, the use of an effect to gray out a portion of the screen impedes the interactivity in a session according to a first presentation layer protocol as a "full screen fade out" can send several megabytes of data from the server to the client; this renders the presentation layer protocol client software inoperable until the fade out has completed and users on VPN/WAN links may find their session "locked up" or inaccessible for a considerable period of time. The technique in this disclosure targets the specific code that performs the fade out and informs it that a remote session according to a second presentation layer protocol is active so that the fade out does not occur.

Figure 9:
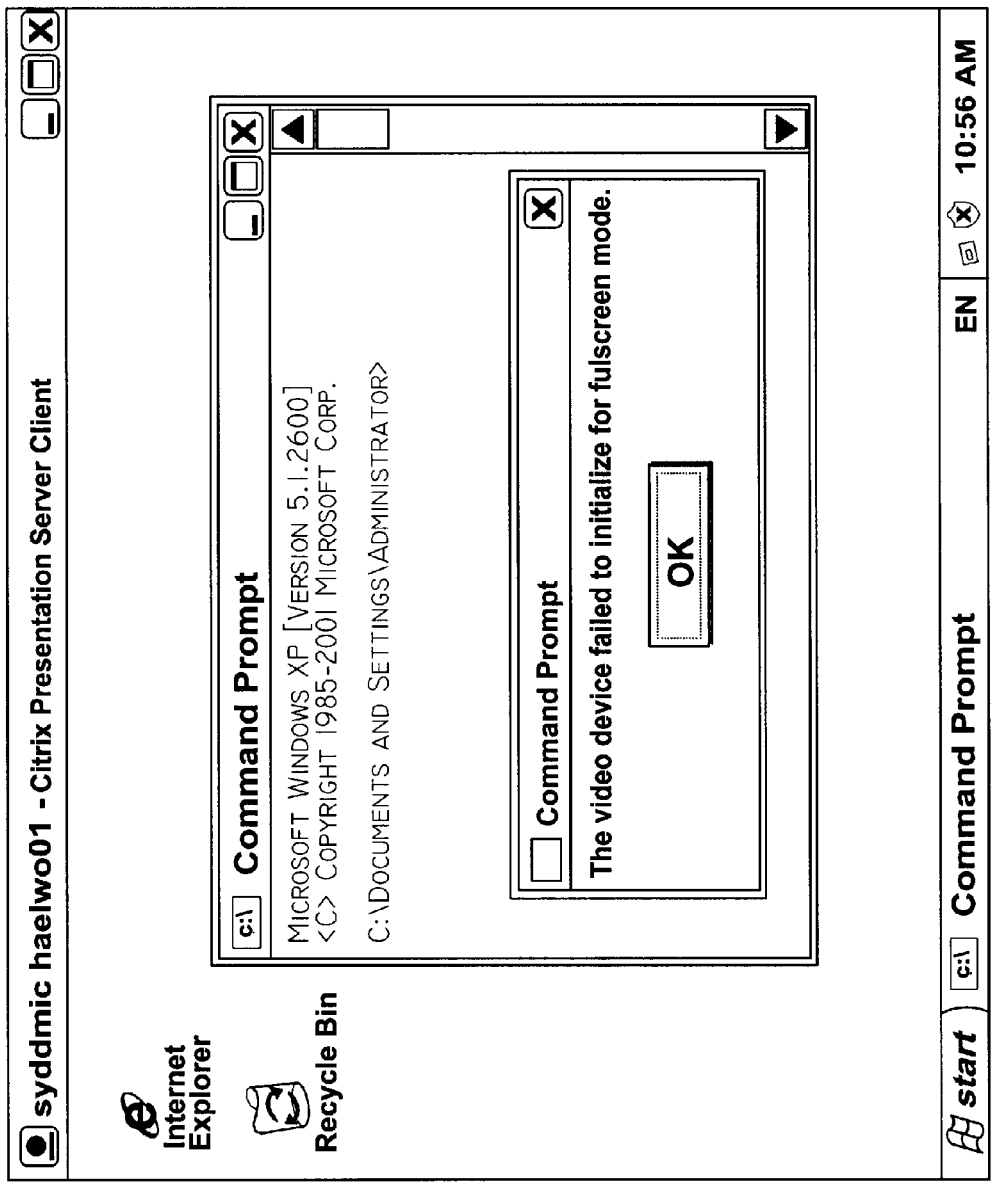
FIG. 9 is a screen shot depicting one embodiment of a system for providing access in one presentation layer protocol session to functionality for modifying a window size, the functionality typically provided by a second presentation layer protocol.

Referring now to FIG. 9, a screen shot depicts one embodiment of a system providing access in one presentation layer protocol session to functionality for modifying a window size, the functionality typically provided by a second presentation layer protocol. In some embodiments, a user may change a window size with a keyboard shortcut—for example, a user may make console applications (like CMD.EXE) full screen by hitting the ALT-ENTER key combination. In other embodiments, for example, in an RDP-based session, this will not work and an error dialog is presented to the user. In still other embodiments, for example, a non-RDP-based session—such as ICA on a WINDOWS XP/WINDOWS VISTA operating system—the full screen switch occurs and no additional ICA session updates are received. In some embodiments, by applying the methods described above, the full-screen switch will not occur when an ICA-based session is active, because the RDP-based functionality of preventing the switch and generating an error dialog is implemented.

Figure 10:
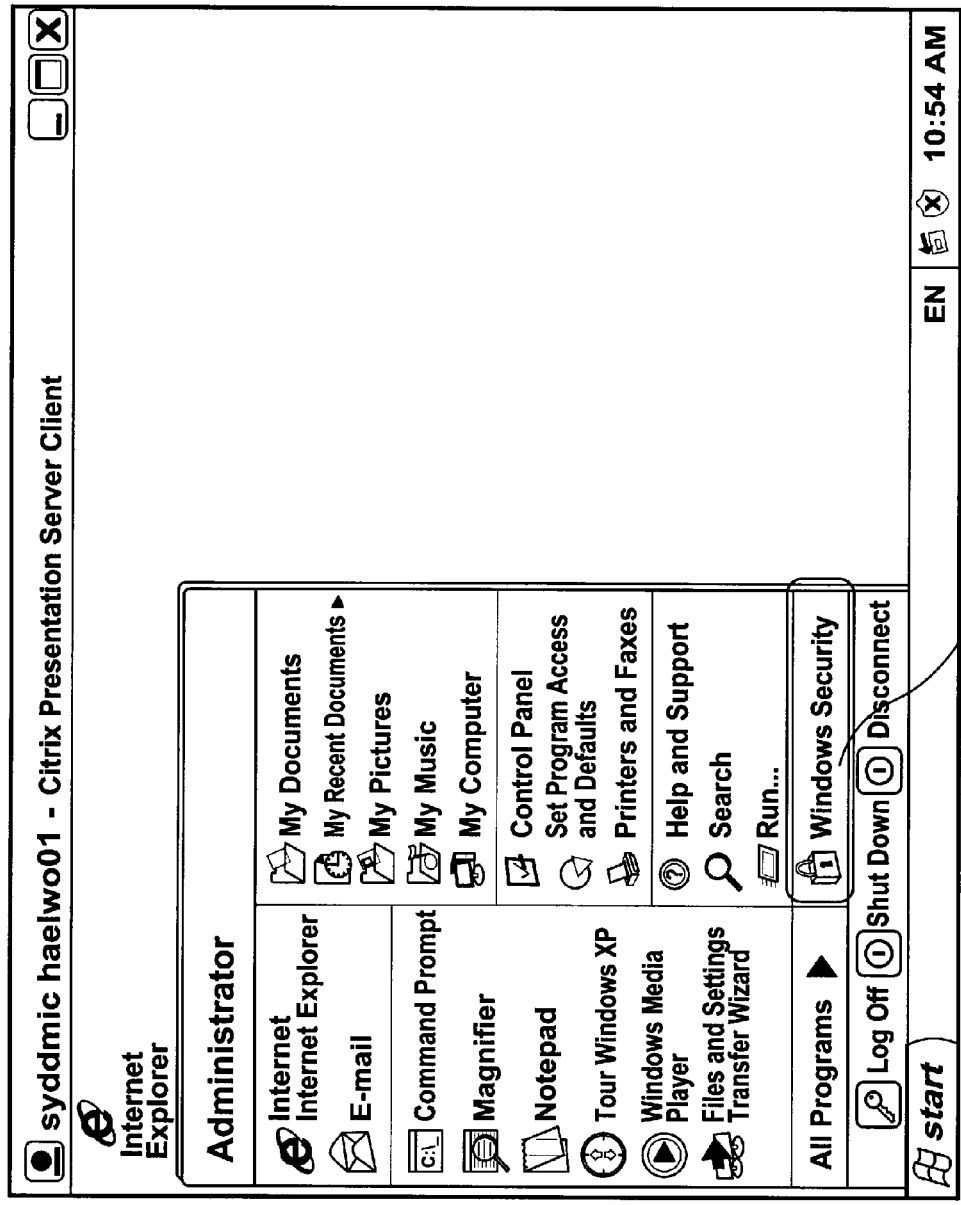
FIG. 10 is a screen shot depicting one embodiment of a system for providing access in one presentation layer protocol session to a menu item typically provided by a second presentation layer protocol.

Referring now to FIG. 10, a screen shot depicts an embodiment of a system providing access in one presentation layer protocol session to a menu item typically provided by a second presentation layer protocol. In one embodiment, in a session such as an RDP-based session, a "WINDOWS SECURITY" item 1002 is added to the "Start" menu. This allows the user to perform several actions like changing their password, or logging off. In some embodiments, sessions based on other presentation layer protocols may not trigger the local operating system 204 to enable the functionality for displaying the "WINDOWS SECURITY" item 1002 in the "Start" menu. In one of these embodiments, by indicating to the operating system component responsible for directing the display of the "WINDOWS SECURITY" item 1002 that a remote session is active, the hooking component 202 enables the functionality typically provided by an alternate presentation layer protocol.

Figure 11:
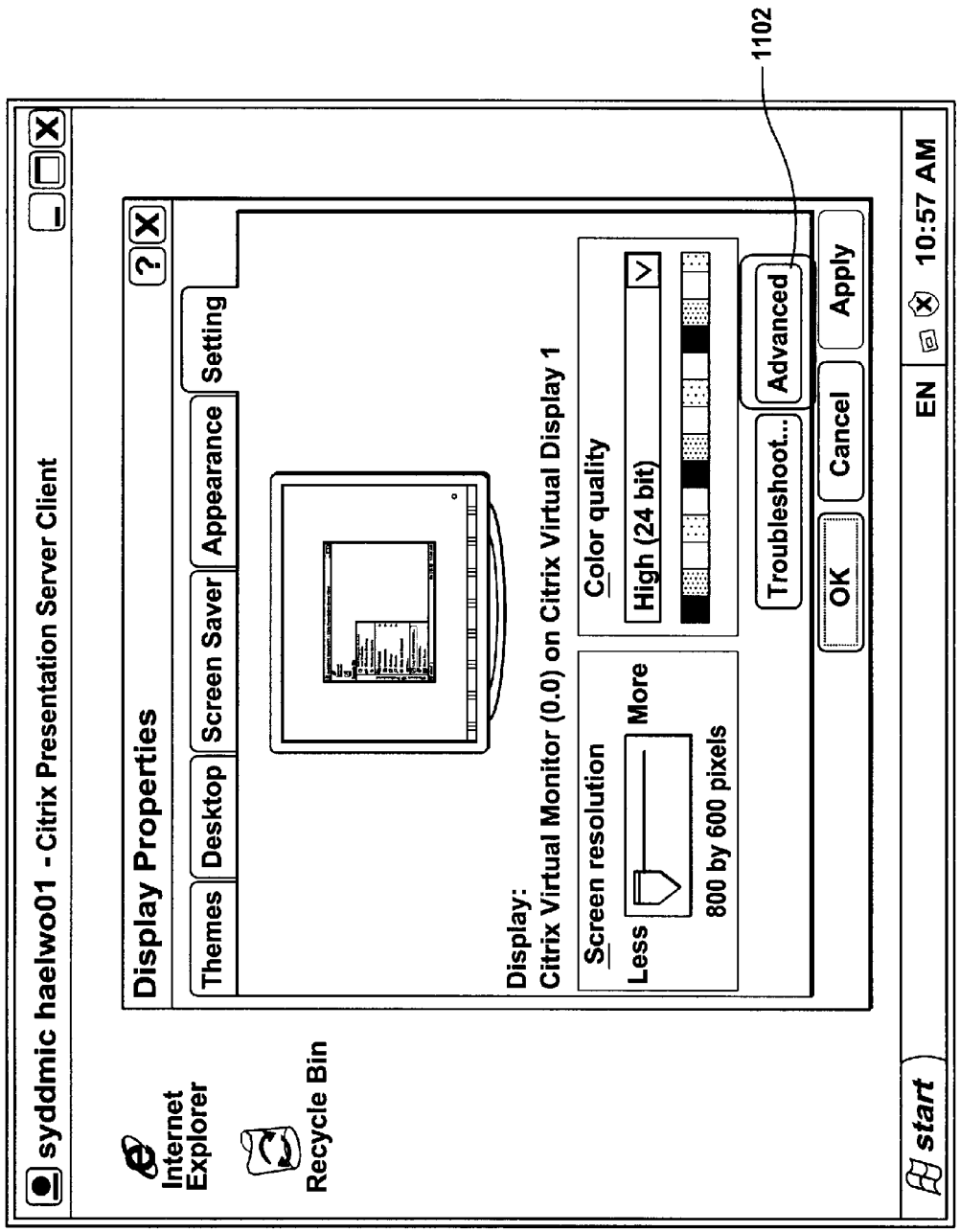
FIG. 11 is a screen shot depicting one embodiment of a system for providing access in one presentation layer protocol session to a configuration setting typically provided by a second presentation layer protocol.

Referring now to FIG. 11, a screen shot depicts an embodiment of a system providing access in one presentation layer protocol session to a configuration setting typically provided by a second presentation layer protocol. In one embodiment, during a presentation layer protocol session (such as an RDP-based session), an "Advanced" button 1102 within a "Display Settings" menu is disabled; in contrast, when the presentation layer protocol session is inactive (for example, on a console of a machine executing WINDOWS XP locally), the button 1102 is enabled. In another embodiment, indicating that a remote session based on the first presentation layer protocol is in progress results in disablement of the button 1102 during the session based on the second presentation layer protocol.

Figure 12:
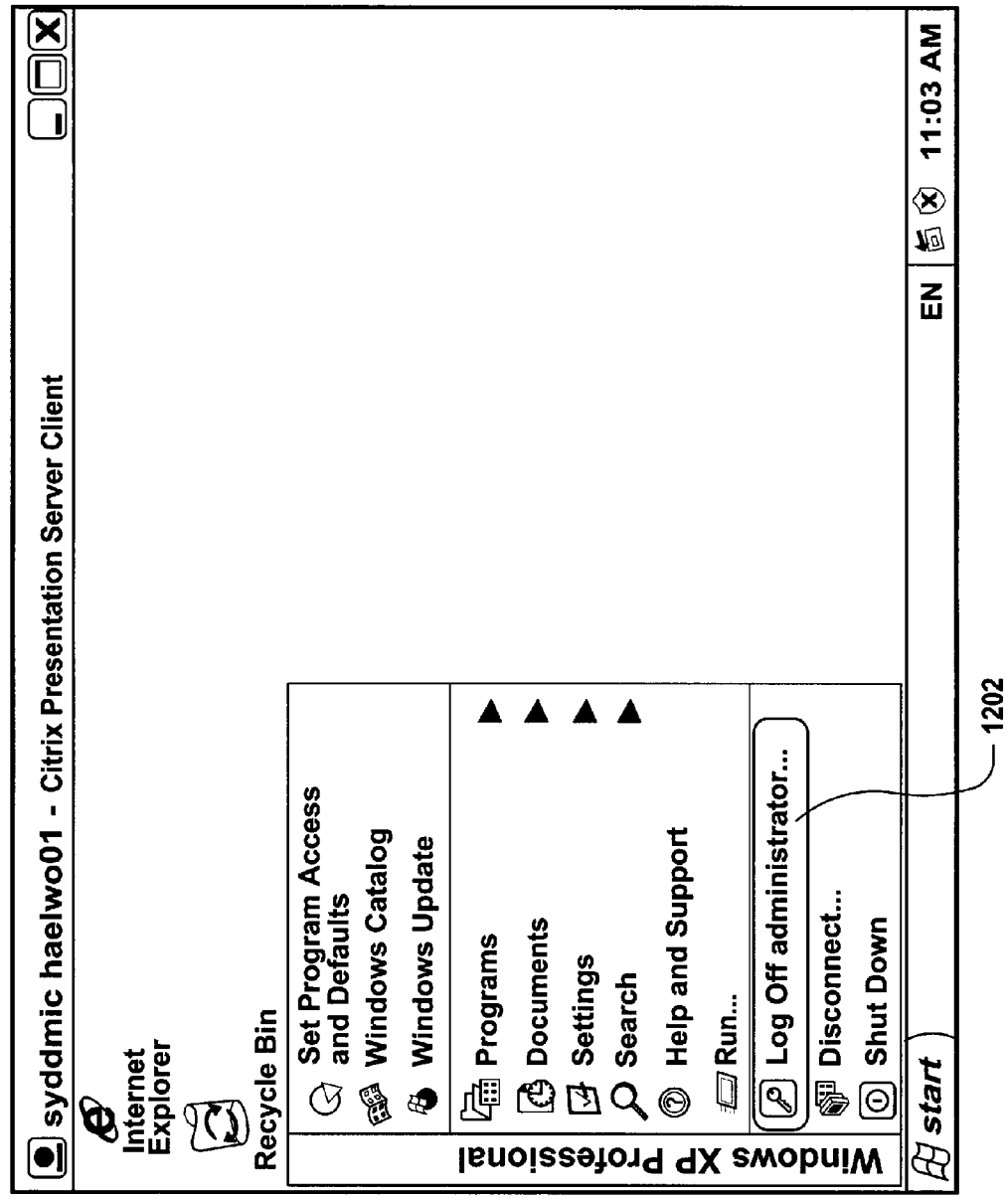
FIG. 12 is a screen shot depicting one embodiment of a system for providing access in one presentation layer protocol session to a menu item typically provided by a second presentation layer protocol.

Referring now to FIG. 12, a screen shot depicts an embodiment of a system providing access in one presentation layer protocol session to a menu item typically provided by a second presentation layer protocol. In one embodiment, in a console of WINDOWS XP/VISTA operating systems, when the "Start" menu is in "Classic Mode", the "Log Off" item 1202 on the "Start" menu is not available. In another embodiment, indicating that a remote session based on a first presentation layer protocol is in progress makes the menu item available. In still another embodiment, the hooking component 202 determines that a remote session based on a second presentation layer protocol is in progress and indicates to the operating system that a remote session based on a first presentation layer protocol is in progress in order to enable the functionality for displaying the menu item.

In some embodiments, existing system components call an applications programming interface (API), such as a GetSystemMetrics (SM_REMOTESESSION) API, to determine whether it should enable functionality for use during sessions based on a first type of presentation layer protocol. In one of these embodiments, implementation of the methods and systems described above results in a hooking component 202 intercepting the call to the API. In another of these embodiments, the hooking component 202 identifies a characteristic of a module calling the API and determines whether to indicate that a remote session based upon the first type of presentation layer protocol, is in progress, responsive to the identified characteristic.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing access in one presentation layer protocol session to functionality typically provided by a second presentation layer protocol, it will now become apparent to one of skill in the art that other embodiments incorporating the concepts of the invention may be used. Therefore, the disclosure should not be limited to certain embodiments, but rather should be limited only by the spirit and scope of the following claims.

The invention claimed is:

1. A method for enabling a feature provided by a first presentation layer protocol, within a session established according to a second presentation layer protocol, the method comprising:
   intercepting, by a hooking component executing on a first machine, a request, by an operating system executing on the first machine, for an indication whether the first machine established a session with a second machine according to a first presentation layer protocol;
   determining, by the hooking component, that the first machine established a session with the second machine according to a second presentation layer protocol;
   identifying, by the hooking component, a type of a function within the operating system that generated the request for the indication;
   indicating, by the hooking component, to the operating system, that the first machine established the session with the second machine according to the first presentation layer protocol, responsive to the identification of the type of the function; and
   enabling, by the operating system, functionality provided for use in sessions established according to the first presentation layer protocol.

2. The method of claim 1 further comprising identifying, by the hooking component, a type of a second function within the operating system that generates a second request for an indication whether the first machine established a session with a second machine according to a first presentation layer protocol.

3. The method of claim 2 further comprising indicating, by the hooking component, to the operating system, that the first machine established the session with the second machine according to the second presentation layer protocol, responsive to the identification of the type of the second function.

4. The method of claim 3 further comprising disabling, by the operating system, functionality of a first type provided for use in sessions established according to a first presentation layer protocol.

5. The method of claim 4 further comprising replacing, by the operating system, the disabled functionality of the first type with functionality of a second type.

6. The method of claim 1 further comprising intercepting, by the hooking component, a request, by the operating system, for an indication whether a session established between the first machine and the second machine according to the first presentation layer protocol is active.

7. The method of claim 6 further comprising:
determining, by the hooking component, that the session established between the first machine and the second machine according to the first presentation layer protocol is inactive;
determining, by the hooking component, that a session established between the first machine and the second machine according to the second presentation layer protocol is active; and
indicating, by the hooking component, to the operating system, that the session established according to the first presentation layer protocol is active.

8. The method of claim 6 further comprising:
determining, by the hooking component, that the first machine did not establish a session with the second machine according to the first presentation layer protocol;
determining that a session established between the first machine and the second machine according to the second presentation layer protocol is active; and
indicating, by the hooking component, to the operating system, that the session established according to the first presentation layer protocol is active.

9. The method of claim 1 further comprising determining, by the hooking component, that the first machine did not establish a session with the second machine according to the first presentation layer protocol.

10. The method of claim 1 further comprising accessing, by the hooking component, a database to determine whether to indicate to the operating system that the first machine established the session with the second machine according to the first presentation layer protocol.

11. A system for enabling features provided by a first presentation layer protocol in a session using a second presentation layer protocol comprising:
means for intercepting a request from an operating system executing on a first machine for an indication whether the first machine established a session with a second machine according to a first presentation layer protocol;
means for determining that the first machine established a session with the second machine according to a second presentation layer protocol;
means for identifying, by the hooking component, a type of a function within the operating system that generated the request for the indication;
means for indicating to the operating system, that the first machine established the session with the second machine according to the first presentation layer protocol, responsive to the identification of the type of the function; and
means for enabling, by the operating system, functionality provided for use in sessions established according to the first presentation layer protocol.

12. The system of claim 11 further comprising means for identifying a type of a second function within the operating system that generates a second request for an indication whether the first machine established a session with a second machine according to a first presentation layer protocol.

13. The system of claim 12 further comprising means for indicating, to the operating system, that the first machine established the session with the second machine according to the second presentation layer protocol, responsive to the identification of the type of the second function.

14. The system of claim 13 further comprising means for disabling, by the operating system, functionality of a first type provided for use in sessions established according to a first presentation layer protocol.

15. The system of claim 14 further comprising means for replacing, by the operating system, the disabled functionality of the first type with functionality of a second type.

16. The system of claim 11 further comprising means for intercepting a request from the operating system for an indication whether a session established between the first machine and the second machine according to the first presentation layer protocol is active.

17. The system of claim 16 further comprising:
means for determining that the session established between the first machine and the second machine according to the first presentation layer protocol is inactive;
means for determining that a session established between the first machine and the second machine according to the second presentation layer protocol is active; and
means for indicating, to the operating system, that the session established according to the first presentation layer protocol is active.

18. The system of claim 16 further comprising:
means for determining that the first machine did not establish a session with the second machine according to the first presentation layer protocol;
means for determining that a session established between the first machine and the second machine according to the second presentation layer protocol is active; and
means for indicating, to the operating system, that the session established according to the first presentation layer protocol is active.

19. The system of claim 11 further comprising means for determining, by the hooking component, that the first machine did not establish a session with the second machine according to the first presentation layer protocol.

20. The system of claim 11 further comprising means for accessing, by the hooking component, a database to determine whether to indicate to the operating system that the first machine established the session with the second machine according to the first presentation layer protocol.

* * * * *